Patented Mar. 29, 1938

2,112,442

UNITED STATES PATENT OFFICE 2,112,442

METHOD OF MAKING CHEESE CAKE, AND PRODUCT EMPLOYED THEREWITH

Morris B. Libanoff, Chicago, Ill.

No Drawing. Application August 17, 1935,
Serial No. 36,698

15 Claims. (Cl. 99—92)

My invention relates to the preparation of cheese cake. It relates more in particular to an improved composition adapted for use in the preparation of cheese cake, together with the method of producing and employing such material.

Heretofore, one of the most difficult baking problems has been the production of high grade cheese cake. The types, proportions and characteristics of materials employed, in general, are so critical that, unless exactly the right amount of ingredients is used, a cake of the proper texture, fluffiness, and the like, is not obtained. Cheese of a type employable in cheese cake does not run uniform. For this reason, it is impossible to develop and employ a standard formula which all good bakers can use; the baker skilled in the production of cheese cake must have a highly developed faculty of determining, by experience alone, and with no accurate criterion to guide him, just when his cheese cake batter is of proper consistency, etc., for baking. For this reason, it has been substantially impossible to produce satisfactory cheese cakes in all baking establishments. Bakers having the ability to produce high grade cheese cakes usually specialize in this type of product and wholesale this product to other bakers.

The principal object of my present invention is the production of an improved cheese cake.

Another object is the utilization of a process which will permit substantially any skilled baker to make a high grade cheese cake.

Another object is the provision of a method whereby the highly developed art of an expert cheese cake baker may be made available to those possessed of lesser degrees of skill.

A further object is to provide for the cheese cake baker a previously prepared composition adapted for use in the preparation of cheese cake.

Other objects and features of the invention will be apparent from a consideration of the following detailed description.

In general, I practice my invention and secure the objects thereof set out hereinabove by making a preliminary composition comprising cheese, a small amount of a farinaceous or cereal constituent, shortening, and a part of the milk and sugar employed. This preliminary composition is of a somewhat heavier consistency than the finished batter, as a rule. It may contain other ingredients than those mentioned, such as flavoring, egg material, and the like, as will be explained more in detail hereinafter. This preliminary composition is frozen and kept in a frozen condition until ready for use.

When cheese cake is made from the preliminary composition, the preliminary composition is thawed out, and then beaten up to batter consistency. Additional sugar, and aqueous liquid, such as milk, and egg material, including egg whites, are then worked in, together with flavoring, if no flavoring has been incorporated in the frozen product, and the cheese cake placed in pans and baked. The process, as will be explained more in detail, is relatively very simple and produces an improved cake.

The cheese cake made in accordance with my invention may be baked in the customary way; that is to say, it may have a supporting dough bottom. Preferably, however, it is baked without a separate support of any kind. As a rule, I prefer to grease the pan employed, sprinkle cake crumbs on top of the grease, pour the batter into the pan so prepared, sprinkle cake crumbs on top of the batter, and bake the same at a temperature roughly around 300° F. I find that a cheese cake made with frozen ingredients rises much higher in the pan, can be baked at lower temperatures, and, in general, behaves better during baking than a cheese cake not employing frozen materials. In addition, the final batter can be prepared somewhat more readily, if the frozen composition is employed than if none of the ingredients has been preliminarily frozen.

For the convenience of those skilled in the art, and in order further to explain my invention, I shall give below a number of illustrative formulae, and describe the manner in which my invention is carried out therewith.

*Example 1*

I prepare a cheese cake in accordance with my invention having the following formula:

Baker's cheese (a dry cottage cheese)

| | pounds | 25 |
|---|---|---|
| Egg yolks | do | 3 |
| Corn starch | do | 4 |
| Bread flour | do | 4 |
| Vegetable shortening | do | 3½ |
| Sweet cream | do | 12 |
| Salt | ounces | 10 |
| Liquid egg whites | do | 11½ |
| Whole milk | pounds | 25 |
| Cane sugar | do | 21 |

In preparing a cheese cake having this formula, in accordance with my invention, I first prepare a preliminary mix containing cheese, 25 pounds; egg yolks, 3 pounds; starch, 4 pounds; flour, 4 pounds; shortening, 3½ pounds; sweet cream, 12 pounds; salt, 10 ounces; sugar, 11 pounds; and milk, 15 pounds. This preliminary mixture is made in any suitable manner to produce a homogeneous batter-like product. This product is then frozen to a temperature of approximately −10° F. or somewhat higher, and kept in a frozen condition until ready for use. When the cheese cake is to be made, this mixture, containing the proportions of ingredients outlined, is thawed and brought to a consistency convenient for mixing. 11½ pounds of liquid egg whites are now beaten up thoroughly, and after they have been beaten stiff, 10 pounds of cane sugar are gradually added, while the whites are continuously beaten. The egg whites, with the sugar added, are then worked slowly into the thawed batter, preferably by an operation which substantially folds the whites in, and 10 pounds of milk are at the same time added gradually until all of the ingredients have been incorporated. Flavoring, such as oil of lemon, can be incorporated with the milk.

The batter so prepared is placed in a pan, previously greased and coated with cake crumbs. The cake is baked at a temperature of between 280 and 310° F. for about forty-five minutes. The manner in which the freezing step improves the product is illustrated by the fact that, in the formula given above, the height of the cheese cake is increased roughly one-quarter inch in a cake normally 1½ to 2 inches thick, by the use of the freezing step alone. The cake prepared from the frozen ingredients can be baked at a somewhat lower temperature and behaves better in that, during baking, it will rise gradually to proper height and will remain there without falling. Ordinarily, cheese cake has a tendency, during baking, to puff up higher than the final baked product will be, and then to fall partly later on in the cooling process. This puffing-up action also produces cracks and fissures in the top of the cake very often, and usually results in the sides of the cake appearing corrugated and uneven. Cheese cake made in accordance with my process almost always has a perfectly smooth top and side walls, without a crease or wrinkle.

Before discussing the manner in which the formula given in Example 1 may be modified, I shall give other illustrative examples, and then indicate generally the manner in which all of these examples may be modified.

*Example 2*

I prepare a frozen composition containing the following ingredients:

Baker's cheese (a dry cottage cheese)
_____pounds__ 25
Egg yolks_____do____ 2½
Sour cream (18% butter fat)_____do____ 8
Sweet cream (22% butter fat)_____do____ 8
Butter cream (42% butter fat)_____do____ 5
Cane sugar_____do____ 11
Milk_____do____ 13
Flour_____do____ 5
Starch_____do____ 5
Salt_____ounces about__ 10

To approximately 83 pounds of the above mixture, after freezing and thawing, I add 11½ pounds of liquid egg whites, 10 pounds of cane sugar, and 10 pounds of milk, prepared as described in connection with Example 1. The batter so prepared is baked at a temperature of 300 to 310° F. for about forty-five minutes.

*Example 3*

I prepare a mixture for freezing in accordance with the following formula:

Baker's cheese (a dry cottage cheese)
_____pounds__ 25
Liquid egg whites_____do____ 5
Sour cream (18% butter fat)_____do____ 8
Sweet cream (22% butter fat)_____do____ 8
Butter cream (42% butter fat)_____do____ 5
Cane sugar_____do____ 11
Flour_____do____ 4
Starch_____do____ 4
Milk_____do____ 12
Salt_____ounces about__ 10

In preparing this mixture, the egg whites are not beaten up, but are mixed in a liquid condition.

To about 83 pounds of this mixture when frozen and thawed, I add 15 pounds of whole eggs and 12 pounds of sugar. In adding these additional constituents, the sugar and whole eggs are beaten up together until they become stiff. They are then folded into the master batter. Suitable flavoring, as in all cases, may be added at this point.

The batter so prepared is baked at a temperature of 310 to 330° F. for about forty-five minutes.

*Example 4*

The present example is for the production of a so-called cheese fluff, which is of slightly different character than the conventional cheese cake. According to this example, I first prepare a preliminary mixture or composition in accordance with the following formula:

Baker's cheese (a dry cottage cheese)
_____pounds__ 24
Granulated cane sugar_____do____ 6
Hydrogenated vegetable shortening_____do____ 6
Whole eggs (or four pounds of yolks)_____do____ 8
Milk_____do____ 16
Salt_____ounces__ 8

This composition is frozen and kept in a frozen condition until ready for use. After being thawed out, the final batter is made therefrom by adding 12 pounds of egg whites and 10 pounds of cane sugar. This final mixture is made preferably by first beating up the egg whites to a stiff consistency, then adding the sugar gradually while continuing to beat the whites.

The product produced in accordance with this example requires a dough bottom for support. Any suitable type of dough may be used, such as a so-called cookie dough. The baking time is approximately two and one-half hours, in an oven maintained at a moderate baking temperature, of about 280 to 300° F. During baking, the product is freed of gaseous materials by punching holes of small diameter therethrough at periods during the baking.

I may modify the formulae given hereinabove somewhat, may substitute certain materials, and make other changes, without departing from the spirit and scope of the invention.

In any of the formulae given above, I may, in place of so-called baker's cheese, substitute conventional types of cottage cheese. It is almost always necessary to make some change in the formulae given, however, to allow for the additional amount of moisture introduced in the cottage cheese. I may employ so-called whole milk cheeses processed substantially the same as cottage cheese, but preferably pressed to remove the major portion of the whey. A suitable cheese is a skimmed milk cheese to which some cream or cream cheese may be added. Usually the amount of cream cheese employed should not be excessive, because it tends to make the batter too liquid. A ratio of skimmed milk cheese to cream cheese of about four to one usually is satisfactory. Attention is called to Example 2 given hereinabove, in which cream is added to the preliminary mixture or composition. This is substantially equivalent to adding a cream cheese to the cottage cheese insofar as the results obtained are concerned. When the amount of cream cheese is increased or when substantial proportions of fresh or sour cream are used, the amount of shortening in the batter can be decreased or eliminated entirely. I may also employ many cheeses other than those of the so-called bland type for the purpose of modifying the flavor. A cheese cake made with one part of Cheddar cheese to ten parts of cottage cheese is very tasty and has a pleasant tang, much liked by some people. The usual run of consumer, however, prefers a cheese cake made either with cottage or so-called baker's cheese.

The amount and character of the farinaceous or cereal materials employed may be varied somewhat. The cereal material, in general, functions as a binding agent, whereby it is made possible to produce a self-sustaining cheese cake, when otherwise a supporting crust would have to be used. Other types of binding agents may be employed, such as a substantial proportion of egg yolks. In general, however, I prefer the use of some farinaceous or cereal materials. For starch, I may employ ordinary corn starch, tapioca starch, or other common edible starches. Flour should be of the hard winter wheat variety, but so-called soft flours may be employed; in general, the latter must be used in greater amounts to secure the same results. Gelatin and gelatinized starch, and similar constituents, may also be used with good results. To illustrate: in Example 1, I may substitute all of the flour for all of the starch, or vice versa, using 8 pounds of either, and secure good results. I may reduce the amount of flour and starch, say to 2½ pounds of each. The amount may be increased to 5 pounds of each, or more, depending upon the character of the cheese and the amount of moisture employed. The same kind of modifications may be made in Example 2 with respect to both the flour and the starch. Four or five pounds of both starch and flour in both of these formulae produce good results. Example 2 is considerably improved by the incorporation of two to four ounces of gelatin, the amount of starch and/or flour being decreased proportionately.

The type of shortening employed preferably is hydrogenated or partially hydrogenated vegetable oil having a clearing point of approximately 100° F., or slightly below. Lard and butter may also be used. The shortening constituent may be supplied by the use of whole milk, whole milk cheese, and/or proportions of sweet or sour cream, the butter fat so supplied being sufficient in many formulae to supplant the shortening. Liquid oils may be employed, if desired, but, in general, a smaller amount can be used; the results, however, are not as satisfactory. For special types of cheese cakes, mineral oil may be used, but for conventional and popular cheese cakes, mineral oil ordinarily should not be used as a constituent.

The amount and character of sugar is subject to some modification. In the preliminary or frozen composition, I prefer to employ a sugar which can be used in somewhat larger proportions than cane sugar. Corn and beet sugars are suitable for the purpose. I may, however, substitute cane sugar. In Example 1, for instance, I may employ corn sugar in place of the cane sugar. Any of the usual edible sugars may be employed. Invert sugar is used satisfactorily, with the egg whites, for addition to the frozen and thawed product. Honey may be employed, preferably in the batter.

With the cheese cake of my invention, substantially any flavor may be employed. Salt, preferably, is incorporated with the frozen product, but the flavoring ingredient, such as lemon, vanilla, or the like, usually should be added when the final batter is made, because freezing tends to destroy the flavor, particularly when fresh flavors are used. I have used, with satisfaction, besides lemon, vanilla and other extract flavors, chocolate, fresh fruit flavors, including strawberry, pineapple, and the like.

I have previously described that whole milk may be substituted for skimmed milk in the preparation of the cheese cake batter. Suitable results are obtained, particularly in summer weather, by employing dried milk powder, hydrated at the rate of one pound of the milk powder to eight pounds of water.

In preparing the preliminary mixture which is to be frozen, I prefer that all of the ingredients be as cool as possible, consistent with practical handling. By using cheese, milk, eggs (when employed), and other ingredients, taken from a refrigerator, the preliminary batter can be mixed at a temperature of between 40 and 60° F. Better results seem to be obtained by this means in obtaining a more homogeneous product. Furthermore, freezing is effected more quickly.

In general, I control the consistency of the frozen mixture so that when it has been frozen and thawed, it will have about the same consistency as the egg material which is incorporated therewith. Much better results are obtainable if the materials incorporated together are of approximately the same consistency. I may resort to some modification in this regard also. Instead of incorporating a major proportion of the milk in the preliminary frozen mixture, I may incorporate only a relatively small proportion of such milk and then, after the product has been thawed and before the egg whites and additional sugar are introduced, add enough milk to bring the proportions thereof up approximately to that disclosed in the illustrative formulae. For example, in place of employing 15 pounds of milk in the frozen mixture of Example 1, I may employ 5 to 10 pounds of milk or less. After the product with a decreased milk content has been frozen and thawed, enough additional milk is incorporated in the thawed batter before the additional constituents are introduced to bring the amount up to that given in the formula; or to decrease the consistency to approximately that of the egg and sugar mixture to be added.

As previously described, I bake the cheese cake of my invention preferably without a supporting dough layer. The supporting dough layer, however, may be employed, particularly in the product of Example 4. When the batter including a frozen composition is baked, a greater volume is obtained, better appearance, better grain and texture, and particularly smooth side edges. If the same type of batter is baked, in which the freezing step has not been employed, the side edges will frequently be uneven and appear corrugated. This corrugated effect generally can be overcome by employing additional amounts of flour and starch in the batter. If this be done, however, the cheese cake suffers in being much tougher and, in general, in not having the consistency and fluffiness of the product made with a lesser amount of starch and flour. I have already described that the frozen product bakes successfully at a somewhat lower temperature, in fact, should be baked at a lower temperature to secure good results. If baked at a high temperature, it has a tendency to rise too much, and this, generally, is objectionable and may be prejudicial to obtaining a satisfactory cake of creamy consistency and close grained texture. I have also spoken of the increase in volume which is effected by the employment of the freezing step. This is apparently due to a modification of the colloidal characteristics of the protein constituents of the cheese cake batter.

Besides the advantages outlined hereinabove, my invention secures an additional important advantage. By my invention, I make it possible not only to deliver to the ordinary baker or housewife a package containing ingredients for making a high grade cheese cake, but to prepare, pack, and deliver in such a package all of the art possessed by the person skilled in the preparation of cheese cake, but which the expert ordinarily would not be able to turn over to the baker less skilled in this particular branch of baking than himself. In other words, containers of fifteen to fifty pounds' capacity, on the average, can be prepared, in which are packed not only the ingredients to prepare a good cheese cake, but the art of experts. This package can be maintained and shipped from a central location to small cities and towns, and the local baker, by comparatively simple treatment of the contents of the package, can prepare a thoroughly high grade and fresh cheese cake, when otherwise, by no means heretofore available, could such a product be placed in the hands of the small town baker and his customers. My invention permits this to be done, not only without sacrifice of quality in the cheese cake product, but in such a way that the product is actually improved. The small baker who heretofore could not produce a satisfactory cheese cake may, by my invention, produce a better cheese cake than those most highly skilled in the art could produce before my invention.

What I claim as new and desire to protect by Letters Patent of the United States is:

1. A cheese cake mixture in frozen form comprising an intimate admixture of cheese, farinaceous material, a sugar, and aqueous material.

2. A cheese cake mixture in frozen form comprising an intimate admixture of cheese, a farinaceous material of the class consisting of flour and starch, a sugar, and aqueous material.

3. A cheese cake mixture in frozen form comprising an intimate admixture of cheese, a binder of the class consisting of flour and starch, a sugar, and aqueous material.

4. A cheese cake mixture in frozen form comprising an intimate admixture of cheese, egg material, a sugar, and aqueous material.

5. A cheese cake mixture in frozen form comprising an intimate mixture of cheese, farinaceous material, a sugar, and milk.

6. A cheese cake mixture in frozen form comprising an intimate admixture of cheese, farinaceous material, a sugar, and aqeuous material, the proportion of cheese present and the proportion of the total remaining solid constituents being approximately equal.

7. A cheese cake mixture in frozen form comprising an intimate admixture of cheese, a farinaceous material of the class consisting of flour and starch, a sugar, and aqueous material, the proportion of cheese present and the proportion of the total remaining solid constituents being approximately equal.

8. A cheese cake mixture in frozen form comprising an intimate admixture of cheese, a binder of the class consisting of flour and starch, a sugar, and aqueous material, the proportion of cheese present and the proportion of the total remaining solid constituents being approximately equal.

9. A cheese cake mixture in frozen form comprising an intimate admixture of cheese, farinaceous material, a sugar, shortening, and aqueous materials.

10. A cheese cake mixture in frozen form comprising an intimate admixture of cheese, farinaceous material, a sugar, shortening, and milk.

11. In a preparation of cheese cake, the steps of preparing and freezing a mixture of the ingredients of the cheese cake, with the exception of a portion of the egg material, sugar and aqueous material, and thereafter combining with said mixture, after thawing, the remaining portion of the egg material, sugar, and aqueous material.

12. The process of making a cheese cake which comprises forming a mixture of cheese, farinaceous material, a sugar, and aqueous material, freezing said mixture, thawing said mixture, incorporating in said mixture egg material and sugar to form a batter, and then baking the resulting batter.

13. The process of making a cheese cake which comprises forming a mixture of cheese, farinaceous material, a sugar, and aqueous material, freezing said mixture, thawing said mixture, incorporating therewith egg material, sugar, and additional aqueous material to form a batter, and then baking the resulting batter.

14. The process of making a cheese cake which comprises forming a mixture containing cheese, farinaceous material, sugar, aqueous material, and shortening, wherein the amount of cheese is approximately equal to the total remaining solid constituents, freezing the mixture, thawing it, and then incorporating therein egg material beaten to a stiff froth, additional sugar, and additional aqueous material, and then baking.

15. The process of making a cheese cake which comprises forming a mixture containing cheese, farinaceous material, sugar, aqueous material, and shortening, wherein the amount of cheese is approximately equal to the total remaining solid constituents, freezing the mixture, thawing it, and then incorporating therein egg material beaten to a stiff froth, additional sugar, and additional aqueous material, and then baking, the amount of aqueous material incorporated in said frozen mixture being approximately 75% of that incorporated in the total batter.

MORRIS B. LIBANOFF.